United States Patent [19]
Erlston

[11] Patent Number: 6,112,862
[45] Date of Patent: Sep. 5, 2000

[54] SCREW ACTION DISC BRAKE

[76] Inventor: Lester John Erlston, 15714 SW. 72nd Ave., Portland, Oreg. 97224

[21] Appl. No.: 08/845,519

[22] Filed: Apr. 24, 1997

[51] Int. Cl.[7] .............................. F16D 55/08; B62L 3/00
[52] U.S. Cl. ..................... 188/72.8; 188/26; 188/18 A; 188/24.22
[58] Field of Search .................. 188/26, 24.11, 188/72.7, 72.8, 72.1, 64, 24.12, 18 A, 18 R, 17, 24.22, 218 XL, 70 R, 71.1, 71.3, 71.4, 20, 73.2, 114; 301/6.8, 6.9; 192/6 R; 280/264, 259

[56] References Cited

U.S. PATENT DOCUMENTS

| | | | |
|---|---|---|---|
| 483,621 | 10/1892 | Reaney | 188/72.8 |
| 1,612,356 | 12/1926 | Bregoz | 188/72.8 |
| 1,695,665 | 12/1928 | Rueppel et al. | 188/72.8 |
| 2,045,593 | 6/1936 | Frankland | 188/72.8 |
| 2,279,274 | 4/1942 | Johnson et al. | 188/72.8 |

*Primary Examiner*—Douglas C. Butler
*Attorney, Agent, or Firm*—Marger Johnson & McCollom, P.C.

[57] ABSTRACT

A screw action disc brake comprises a disc centered on the wheel hub so that torque steer forces are not generated under braking; and a brake pad mounted on a collar which can be moved toward the disc to apply the brake, and away from the disc to release the brake; the collar in the form of a disc with a central circular hole, for clearing the axle mounting section of the hub, and an internally screw-threaded perpendicular perimeter lip. A circular cradle is fixed onto the axle by splines of screw-threads at its center, in such a manner that it cannot rotate about the axle, the cradle having a perimeter flange which is externally screw-threaded to mesh with the screw threads on the inside of the collar lip. The screw-threads are arranged so that when the collar is rotated on the cradle, by pulling a brake cable, in the opposite direction to that of the forward turning hub, the collar moves towards the brake disc.

6 Claims, 3 Drawing Sheets

SCREW ACTION DISC BRAKE

BACKGROUND OF THE INVENTION

This invention relates to brakes for bicycles, motorcycles and the like, and more particularly to a disk brake structure.

Disc brakes are becoming increasingly popular for use on bicycles. The primary reasons are:

a) the brake pad surface area of disc brakes can be much larger than the brake pad surface area of conventional rim brakes (which are limited by the width of the braking surface area on conventional bicycle wheel rims), improving braking efficiency.

b) the disc brake is mounted on the wheel hub and is less exposed to water and mud than the wheel rims (which form the braking surface of conventional calliper brakes), improving braking efficiency in wet or muddy conditions:

The brake disc is conventionally mounted on one side of the hub, with the calliper mechanism mounted on the bicycle frame; the front calliper mechanism on the forks, the rear calliper mechanism on the seat or chain stays.

Torque forces, generated when the front brake is applied, can cause the front wheel to be steered towards the side the disc is mounted on. Disc brakes mounted on both sides of the hub, motorcycle fashion, would eliminate torque steer but increase weight, complexity and cost.

The invention is designed to:

a) position the brake discs at the center line of the bicycle to eliminate brake induced torque steer;

b) and to allow a larger brake pad surface area to increase braking efficiency.

Although the invention is mainly intended for use on bicycles it can be used to brake any hub or wheel.

SUMMARY OF THE INVENTION

In the invention, the disc forms an integral part of the hub and is located between the axle mounting section of the hub and the spoke flanges, which are located on the outer edge of the disc.

The disc is positioned at a point on the hub where it is in line with the center of the wheel rim, so that torque steer forces are not generated under braking.

The brake pad, which is in the form of a flattened ring, or curved segments of a ring, is mounted on a collar which can be moved toward the disc to apply the brake, and away from the disc to release the brake.

The collar is in the form of a disc with a central circular hole (to clear the axle mounting section of the hub) and an internally screw-threaded perpendicular perimeter lip.

A circular support or cradle, dished for strength and rigidity, is fixed onto the axle by means of splines of screw-threads at its center, in such a manner that it cannot rotate about the axle. Since bicycle axles are non rotatably fixed into the frame drop-outs, the cradle is fixed relative to the hub. The cradle has a perimeter flange which is externally screw-threaded to mesh with the screw threads on the inside of the collar lip.

The collar is screwed onto the cradle, by means of their screw-threads. The direction of the screw-threads must be such that when the collar is rotated on the cradle in the opposite direction to that of the forward turning hub it moves towards the brake disc.

When the brake lever on the handlebar is actuated, it pulls a brake cable connected to the collar. This rotates the collar relative to the cradle, moving it towards the brake disc, and pressing the brake pad onto the disc which slows or stops the hub.

The foregoing and other objects, features and advantages of the invention will become more readily apparent from the following detailed description of a preferred embodiment of the invention which proceeds with reference to the accompanying drawings.

DETAILED DESCRIPTION

Figure 1:
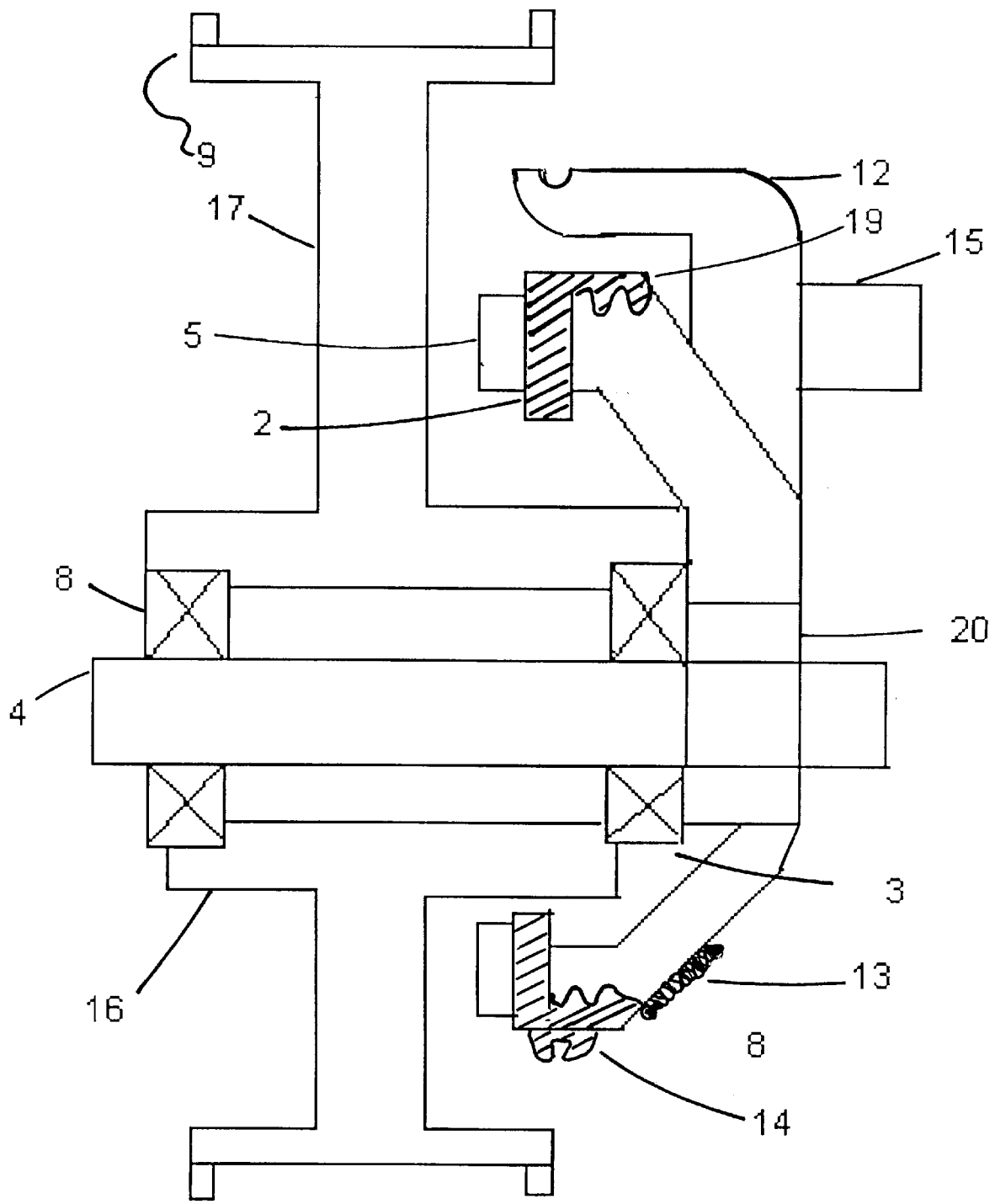
FIG. 1. is a cross section through the hub 1, the collar 2 and the cradle 3.
Figure 3:
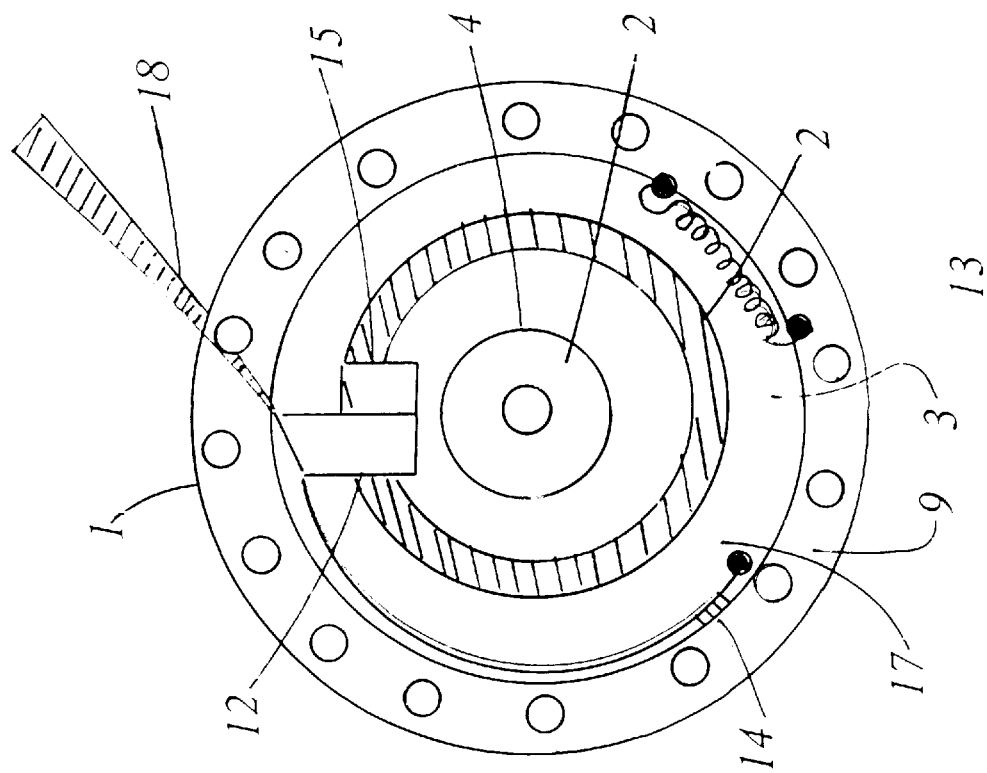
FIG. 3 depicts a side view of hub 1, collar 2 and cradle 3.
Figure 2:
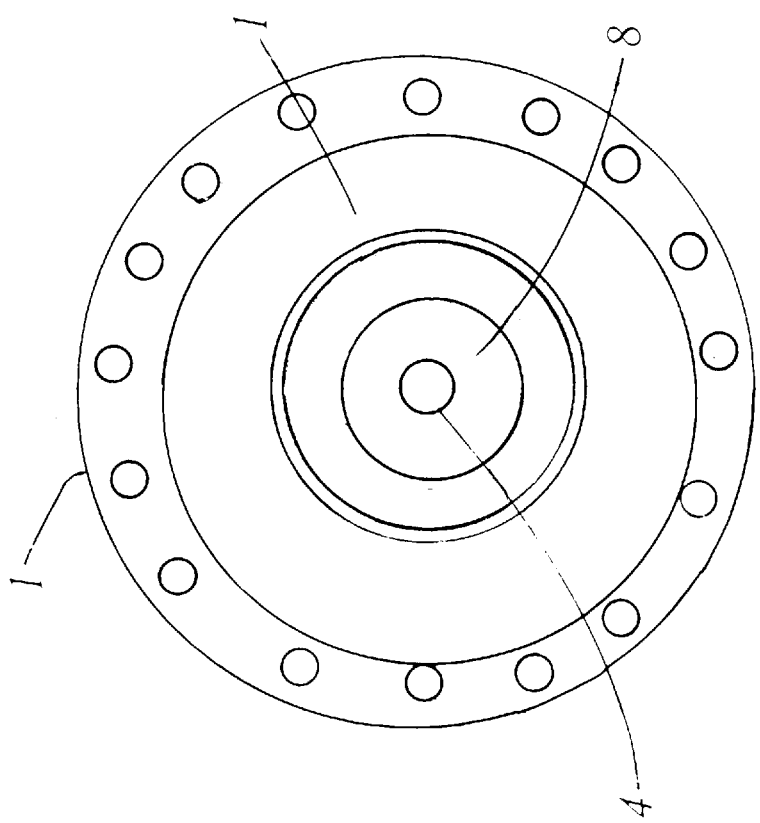
FIG. 2. depicts a side view of hub 1.

A non-limiting example of the invention is described below with reference to the accompanying schematic drawings. The same parts are indicated by the same reference numerals in all drawings. In this embodiment of the invention, a cradle supporting a brake pad collar is fitted to one side of the axle, as it is felt that only one brake pad will be required to provide adequate braking capability for a bicycle. However, cradles and collars can be fitted to both sides of the axle should additional braking capability be required.

The hub 1 incorporates an axle mounting section 16 to accept bearings 8, through which the axle 4 passes, a central disc 17, and spoke flanges 9, suitably drilled to accept spokes, are located on the perimeter of disc 17.

Figure 4:
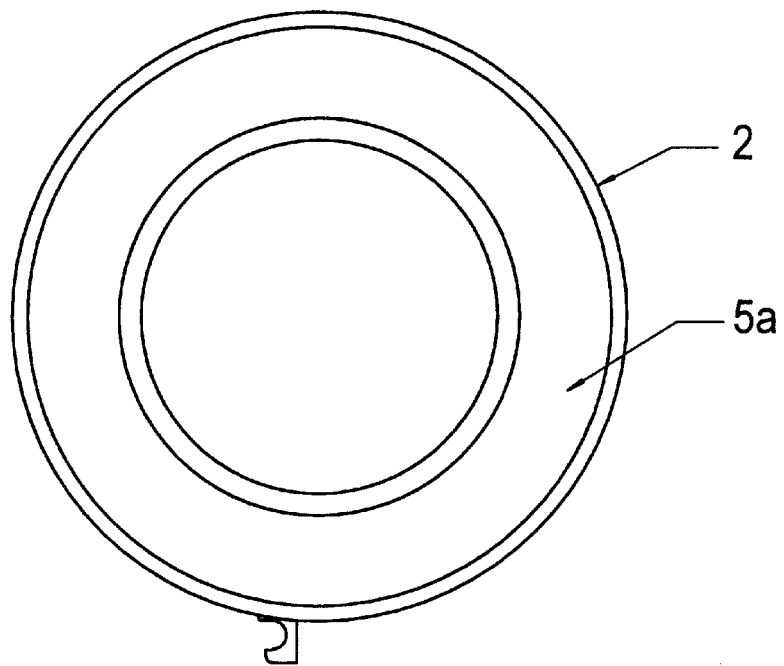
FIGS. 4A and 4B are plan views of two embodiments of the collar and brake pad, FIG. 4A showing a circular brake pad and FIG. 4B showing a brake pad formed of a number of curved segments.
Figure 4:
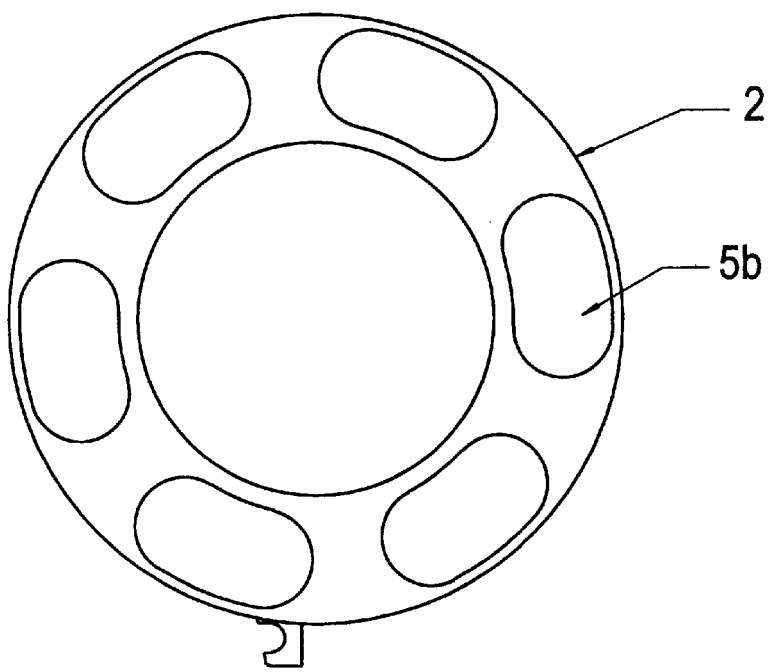

The collar 2 holds circular brake pad 5 (of a suitable friction material; either a single circular pad 5a, or a number of curved segments 5b, as shown in FIGS. 4A and 4B, respectively. The brake pad 5 (or brake pad segments) is replaceable in the event of wear. Internally screw-threaded perpendicular flange 19 allows collar 2 to screw onto cradle 3.

The cradle is externally screw-threaded to mesh with the internally threaded collar flange 19. The cradle 3 is fitted with a cable stop 12 and anti-rotation lug 15.

The axle 4, a solid bar or hollow tube, has an externally threaded or splined section 20 to accept the internally threaded or splined cradle 3. Bearings 8 are located at both ends of axle mounting section 16 of hub 1 to accept axle 4. Drop outs located at the lower ends of the front forks and at the rearmost ends of the chain stays, locate the axle 4.

The brake cable 11 with outer sheath 18 connect the handle-bar mounted brake lever to collar 2; the outer sheath locates in the cradle cable stop 12, allowing the cable to rotate the collar 2 when the brake lever is actuated. The cable stop 12 is suitably located on the cradle 3 into which one end of the cable sheath is fitted which allows the brake cable to be pulled.

A return spring 13 is connected to lugs on both the collar 2 and cradle 3. This enables the brake to be released by returning the collar 2 to its starting position once the brake lever is released. A cable attachment 14 is located on collar 2 to hold the end of the brake cable 11.

An anti-rotation lug 15 is suitably positioned on the cradle 3. It fits against the outside rear edge of the drop-out 10, to prevent braking induced torque from turning the axle 4 in the drop out.

Having described and illustrated the principles of the invention in a preferred embodiment thereof, it should be apparent that the invention can be modified in arrangement and detail without departing from such principles. I claim all modifications and variations coming within the spirit and scope of the following claims.

I claim:

1. A screw action disc brake comprising:

a wheel hub having an axle mounting section for mounting a wheel on an axle;

a brake disc connected to the wheel hub, positioned on the hub substantially in line with a center of a rim of the wheel, so that torque steer forces are not generated under braking;

a brake pad formed as a flattened ring, or curved segments of a ring, mounted on a collar which can be moved toward the brake disc to apply the brake, and away from the brake disc to release the brake;

the collar formed as a disc with a central circular hole, for clearing the axle mounting section of the hub, and an internally screw-threaded perpendicular perimeter lip;

a circular cradle fixed onto the axle so that the cradle cannot rotate about the axle, the cradle having a perimeter flange which is externally screw-threaded to mesh with the screw threads on the inside of the collar lip, the screw-threads arranged so that when the collar is rotated on the cradle in the opposite direction to that of the forward turning hub, the collar moves towards the brake disc.

2. A disc brake mechanism according to claim 1 including a brake cable connected to the collar to rotate the collar relative to the cradle, moving the collar towards the brake disc, and pressing the brake pad onto the brake disc which slows or stops rotation of the hub.

3. A disc brake mechanism according to claim 1 in which the cradle is fixed so that it cannot rotate about the axle by means of splines of screw-threads at its center, in such a manner.

4. A disc brake mechanism according to claim 1 in which the cradle is fixed so that it cannot rotate about the axle by means of an anti-rotation lug for engaging a drop out of a bicycle fork.

5. A disc brake mechanism according to claim 1 in which the wheel hub includes a pair of axially spaced apart annular spoke flanges, being spaced axially between the spoke flanges.

6. A disc brake mechanism according to claim 5 in which the brake disc is centered axially between the spoke flanges.

* * * * *